(12) United States Patent
Cheng et al.

(10) Patent No.: US 9,566,508 B2
(45) Date of Patent: Feb. 14, 2017

(54) INTERACTIVE GAMING APPARATUS USING AN IMAGE PROJECTED ONTO A FLEXIBLE MAT

(71) Applicant: Zeroplus Technology Co., Ltd., New Taipei (TW)

(72) Inventors: Chiu-Hao Cheng, New Taipei (TW); Chien-Yang Liu, New Taipei (TW); Chih-Wei Pien, New Taipei (TW); Tien-yu Wu, New Taipei (TW)

(73) Assignee: ZEROPLUS TECHNOLOGY CO., LTD., New Taipei (TW)

( * ) Notice: Subject to any disclaimer, the term of this patent is extended or adjusted under 35 U.S.C. 154(b) by 255 days.

(21) Appl. No.: 14/329,088

(22) Filed: Jul. 11, 2014

(65) Prior Publication Data
US 2016/0008710 A1    Jan. 14, 2016

(51) Int. Cl.
| | |
|---|---|
| A63F 9/24 | (2006.01) |
| A63F 13/2145 | (2014.01) |
| A63F 13/25 | (2014.01) |
| A63F 13/843 | (2014.01) |
| A63F 13/833 | (2014.01) |
| A63F 13/214 | (2014.01) |

(52) U.S. Cl.
CPC ......... *A63F 13/2145* (2014.09); *A63F 13/214* (2014.09); *A63F 13/25* (2014.09); *A63F 13/833* (2014.09); *A63F 13/843* (2014.09)

(58) Field of Classification Search
CPC ..... A63F 13/00; A63F 13/211; A63F 13/2145
See application file for complete search history.

(56) References Cited

U.S. PATENT DOCUMENTS

| | | | | | |
|---|---|---|---|---|---|
| 4,160,942 | A | * | 7/1979 | Lynch | A63B 24/0021 359/443 |
| 4,915,384 | A | * | 4/1990 | Bear | A63B 24/0021 273/454 |
| 4,974,833 | A | * | 12/1990 | Hartman | A63B 69/004 273/445 |
| 5,566,951 | A | * | 10/1996 | Dart | A63F 9/0291 273/358 |
| 5,616,078 | A | * | 4/1997 | Oh | A63F 13/06 345/156 |
| 5,716,302 | A | * | 2/1998 | Andersson | A63B 24/0021 482/83 |
| 5,913,727 | A | * | 6/1999 | Ahdoot | A63F 13/06 345/156 |
| 5,951,015 | A | * | 9/1999 | Smith | A63B 24/0006 273/358 |

(Continued)

*Primary Examiner* — Steve Rowland
(74) *Attorney, Agent, or Firm* — Muncy, Geissler, Olds & Lowe, P.C.

(57) ABSTRACT

A disclosed interactive gaming apparatus may include a flexible mat structure. The flexible mat structure may have at least one sensor module placed therein. The gaming apparatus may also include a main body having a computation module with gaming software installed therein. When the human operator motions, the sensor module may detect such motions along with data arising out of contact by the human operator on the flexible mat structure and deliver the same to the computation module. The computation module may compute the detected and enable a projector module to project an output image upon a surface of the flexible mat structure.

39 Claims, 20 Drawing Sheets

(56) References Cited

U.S. PATENT DOCUMENTS

| | | | |
|---|---|---|---|
| 6,422,945 B1* | 7/2002 | Okita | A63B 69/32 463/49 |
| 9,227,128 B1* | 1/2016 | Carfagna, Jr. | A63B 69/32 |
| 2004/0102247 A1* | 5/2004 | Smoot | A63F 13/00 463/36 |
| 2007/0021207 A1* | 1/2007 | Ahdoot | A63B 24/0003 463/36 |
| 2008/0200285 A1* | 8/2008 | Haseth | A63B 63/00 473/422 |
| 2012/0051588 A1* | 3/2012 | McEldowney | G03B 17/54 382/103 |
| 2012/0053023 A1* | 3/2012 | Strong | A63B 69/004 482/83 |

* cited by examiner

INTERACTIVE GAMING APPARATUS USING AN IMAGE PROJECTED ONTO A FLEXIBLE MAT

BACKGROUND

1. Technical Field

The present disclosure relates to a gaming apparatus, in particular, to a gaming apparatus capable of interacting with human operators.

2. Description of Related Art

In recent days, the development of arcade gaming devices have been maturing as a variety of companies continue rolling out innovative games into the markets such as adventure games (AVG), shooting games (STG), light gun shooting games (GSTG), Action Games (ACT), fighting games (FTG), first-person shooting games (FPS), sports games (SPG), or racing games (RAG). Those games generally provide a platform allowing for the interactivity between the games themselves and human operators.

In one arcade gaming device in a traditional amusement park, a host with a built-in video game program, a display showing the execution result of the video program, a joystick or other control means and a token receptor are installed. Generally, the human operator inserts the token or coin into the token receptor and controls the video program with the joystick or other control means so as to achieve the interactivity.

However, in the above-mentioned operation mode the interactivity between the video program and the human operator is by shaking or waving the joystick or other control means, which renders any feedback (e.g., vibrations) to the operations of the human operator undesired when it comes to the user experience. Therefore, how to enhance increase the degree of verisimilitude should be among the top priority issues to be addressed by the industry.

Thus, an interactive gaming apparatus having any sensor modules and display modules incorporated and enabling the operations or maneuvering of the human operator to be more accurately presented on the display modules with the sensor modules, the interactivity or the related user experience would significantly improve when the human operator is expected to be in contact with the display modules.

SUMMARY OF THE DISCLOSURE

The present disclosure provides an interactive gaming apparatus capable of incorporating a wide range of sensor modules and a flexible mat structure as one display device. The sensor modules may precisely detect motions/actions of a human operator. The disclosed gaming apparatus may provide the enhanced user experience when the human operator is in contact with the flexible mat structure over the course of participating in games provided by the gaming apparatus.

The disclosed interactive gaming apparatus may include a flexible mat structure disposed at a predetermined position ahead of a human operator. The flexible mat structure may have at least one sensor module placed therein, and the sensor module may detect contact data when the human operator contacts the flexible mat structure. The gaming apparatus may also include a main body having a computation module with gaming software installed therein. The computation module may execute the gaming software, and the sensor module may deliver the contact data to the computation module. The gaming apparatus may further include a projector module for projecting an output image upon a surface of the flexible mat structure when the computation module executes the gaming software.

Specifically, the flexible mat structure is made of flexible material.

Specifically, the flexible material is silica gel.

Specifically, the flexible mat structure is an inflatable flexible mat.

Specifically, the sensor module is an air pressure detector.

Specifically, the flexible mat structure engages with the main body through a spring pulling force component.

Specifically, the sensor module of the flexible mat structure is a pulling force meter.

Specifically, the sensor module is an infrared sensor, an infrared image capturing sensor, a pressure sensor, an ultrasound sensor, a G-sensor, a Load Cell, a radio-frequency (RF) reader, a gyro, a gravity sensor, or combinations of at least two of the above.

Specifically, the infrared sensor detects the position where the human operator contacts the flexible mat structure by infrared interrupting, before transmitting the corresponding contact data to the gaming software executed by the computation module.

Specifically, the pressure sensor detects pressure exerted by the human operator to the flexible mat structure before transmitting the corresponding contact data to the computation module.

Specifically, the flexible mat structure further comprises a hydraulic pump connected to the sensor module for feeding back the human operator based on the pressure exerted by the human operator to the flexible mat structure at the time the human operator contacts the flexible mat structure.

Specifically, the gaming apparatus may further include at least one peripheral flexible mat surrounding the flexible mat structure, wherein the peripheral flexible mat is equipped with a peripheral sensor module for detecting the contact data from multiple angles before delivering the contact data to the computation module.

Specifically, the gaming apparatus may further include an adjoining device through which the flexible mat structure engages the main body.

Specifically, the adjoining device is a bearing.

Specifically, the computation module outputs the contact data in form of a media readable format and presents the contact data on the surface of the flexible mat structure.

Specifically, the contact data in the media readable format is accessed by a portable device capable of accessing the contact data.

Specifically, the flexible mat structure further comprises a first gaming area and a second gaming area, each of the first gaming area and the second gaming area corresponds to one sensor module, and the contact data from both the first gaming area and the second gaming area is inputted into the computation module.

Specifically, the first gaming area and the second gaming area are located at two of the opposite surfaces of the flexible mat structure allowing for two human operators to utilize the gaming apparatus in a face-to-face fashion.

Specifically, the first gaming area and the second gaming area are located at the same surface of the flexible mat structure allowing for two human operators to utilize the gaming apparatus in a side-by-side fashion.

In another embodiment, an interactive gaming apparatus may include a flexible mat structure disposed at a predetermined position ahead of a human operator. The flexible mat structure may have at least one first sensor module placed therein, and the first sensor module may detect contact data when the human operator contacts the flexible mat structure.

The gaming apparatus may also include a main body having a computation module with gaming software installed therein. The computation module may execute the gaming software, and the first sensor module may deliver the contact data to the computation module. The gaming apparatus may also include a projector module for projecting an output image upon a surface of the flexible mat structure when the computation module executes the gaming software. Plus, the gaming apparatus may further include a second sensor module connected to the computation module for detecting an operating status associated with the human operator and transmitting operating status data to the computation module, which in turn computes the operating status data to derive the corresponding output image. The projector module projects the output image upon the surface of the flexible mat structure.

Specifically, the flexible mat structure is made of flexible material.

Specifically, the flexible material is silica gel.

Specifically, the flexible mat structure is an inflatable flexible mat.

Specifically, the first sensor module is an air pressure detector.

Specifically, the flexible mat structure engages with the main body through a spring pulling force component.

Specifically, the first sensor module of the flexible mat structure is a pulling force meter.

Specifically, the first sensor module is an infrared sensor, an infrared image capturing sensor, a pressure sensor, an ultra-sound sensor, a G-sensor, a Load Cell, a radio-frequency (RF) reader, a gyro, a gravity sensor, or combinations of at least two of the above.

Specifically, the infrared sensor detects the position where the human operator contacts the flexible mat structure by infrared interrupting, before transmitting the corresponding contact data to the gaming software executed by the computation module.

Specifically, the pressure sensor detects pressure exerted by the human operator to the flexible mat structure before transmitting the corresponding contact data to the computation module.

Specifically, the flexible mat structure further comprises a hydraulic pump connected to the first sensor module for feeding back the human operator based on the pressure exerted by the human operator to the flexible mat structure at the time the human operator contacts the flexible mat structure.

Specifically, the gaming apparatus may further include at least one peripheral flexible mat surrounding the flexible mat structure, wherein the peripheral flexible mat is equipped with a peripheral sensor module for detecting the contact data from multiple angles before delivering the contact data to the computation module.

The gaming apparatus may further include an adjoining device through which the flexible mat structure engages the main body.

Specifically, the adjoining device is a bearing.

Specifically, the computation module outputs the contact data in form of a media readable format and presents the contact data on the surface of the flexible mat structure.

Specifically, the contact data in the media readable format is accessed by a portable device capable of accessing the contact data.

Specifically, the flexible mat structure further comprises a first gaming area and a second gaming area, each of the first gaming area and the second gaming area corresponds to the first sensor module, and the contact data from both the first gaming area and the second gaming area is inputted into the computation module.

Specifically, the first gaming area and the second gaming area are located at two of the opposite surfaces of the flexible mat structure allowing for two human operators to utilize the gaming apparatus in a face-to-face fashion.

Specifically, the first gaming area and the second gaming area are located at the same surface of the flexible mat structure allowing for two human operators to utilize the gaming apparatus in a side-by-side fashion.

Specifically, the first gaming area corresponds to the first sensor module, the second gaming area corresponds to the second sensor module, and the contact data from the first gaming area and the second gaming area is delivered into the computation module.

Specifically, the second sensor module is a RF reader, a gyro, a gravity sensor, or combinations of two of above.

Specifically, the human operator is equipped with a RFID tag that is accessible by the RF reader, which detects the operating status data of the human operator and delivers the operating status data to the computation module, and the computation module computes the operating status data and enables the projector module to project the corresponding output image upon the surface of the flexible mat structure.

Specifically, the gyro detects angular information of the human operator and delivers the angular information to the computation module.

Specifically, the gravity sensor detects displacement and velocity information of the human operator and delivers the displacement and velocity information to the computation module.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DESCRIPTION OF THE EXEMPLARY EMBODIMENTS

The aforementioned and other technical contents, features, and efficacies will be shown in the following detail descriptions of a preferred embodiment corresponding with the reference Figures.

Figure 1:
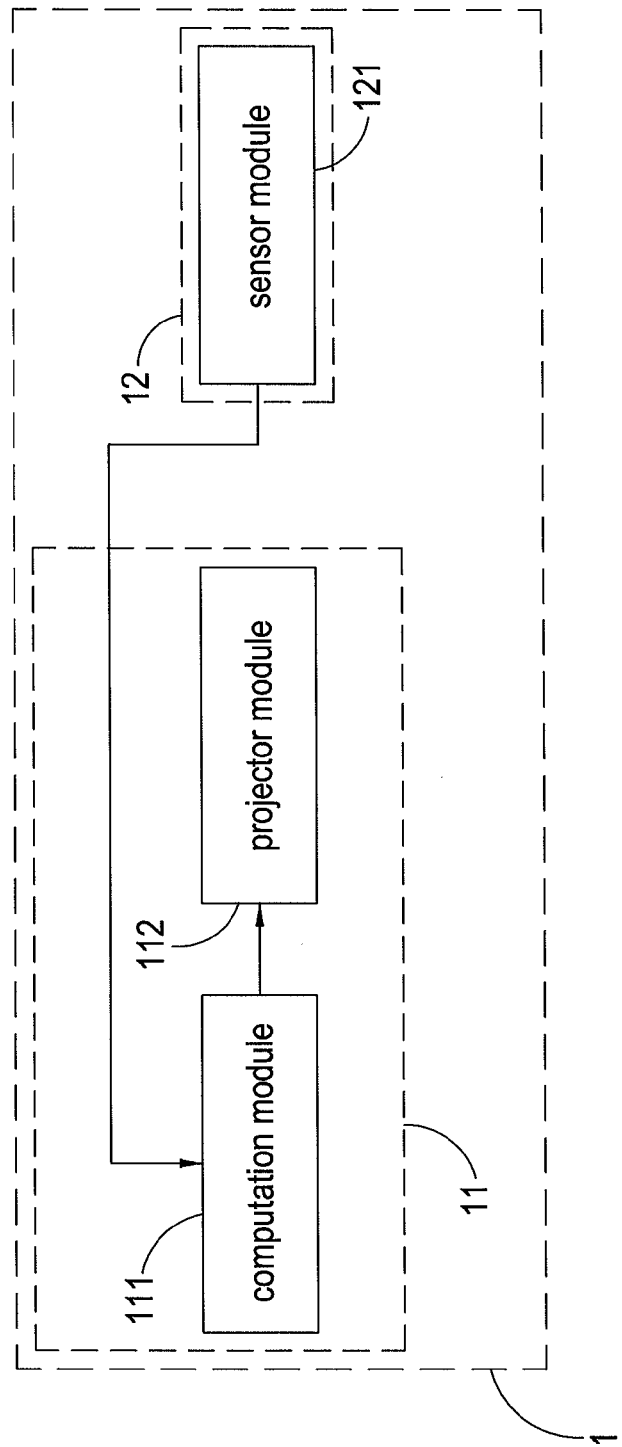
FIG. 1 shows a structural schematic diagram of an interactive gaming apparatus according to one embodiment of the present disclosure.
Figure 2:
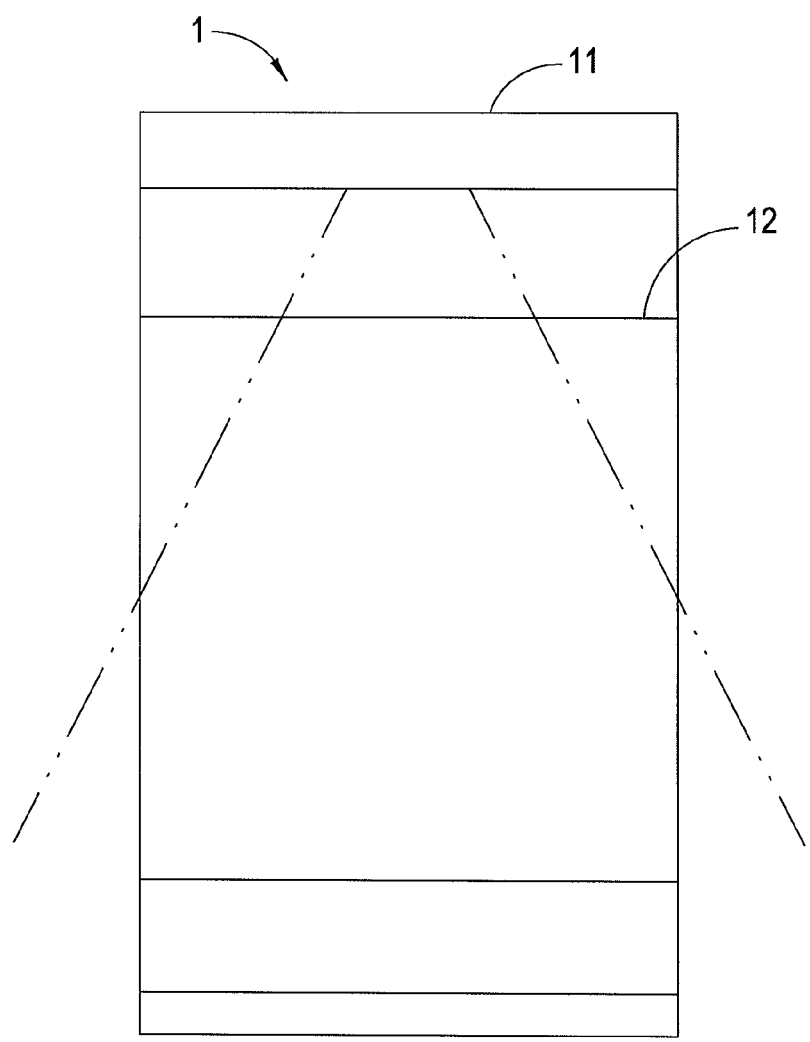
FIG. 2 shows a schematic diagram of an interactive gaming apparatus according to one embodiment of the present disclosure.
Figure 16:
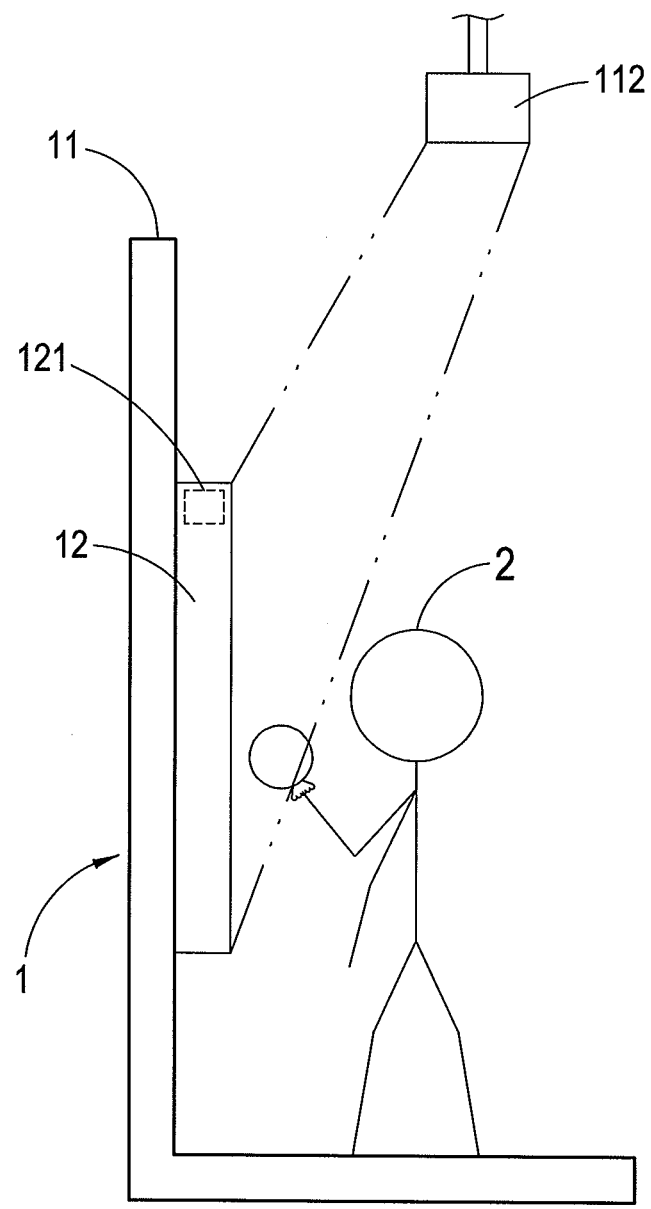
FIG. 16 is a schematic diagram for the placement of the projector module of the interactive gaming apparatus according to one embodiment of the present disclosure.

Please refer to FIGS. 1-2 illustrating a schematic diagram and a structural diagram of an interactive gaming apparatus 1 according to one embodiment of the present disclosure. The interactive gaming apparatus 1 may include a main body 11 having a computation module 111 and a projector module 112 and a flexible mat structure 12 having a sensor module 121. In one implementation, the projector module 112 may be disposed on the main body 11. In another implementation, the projector module 112 may not be disposed on the main body 11. Rather, the projector module 112 may hang above the space where the main body 11 is placed as shown in FIG. 16. When the projector module 112 is not disposed on the main body 11, they are still electrically connected to each other so long as any output of the projector module 112 may be upon the flexible mat structure 12. Gaming software may be installed within the computation module 111. When the computation module 111 executes the gaming software, the flexible mat structure 12 may allow for the contact from the human operator. The flexible mat structure 12 may thereafter deliver corresponding contact data to the computation module 111, which may in turn cause the projector module 112 to present the output upon the surface of the flexible mat structure 12. In one implementation, the projector module 112 may be a CCD-based projector. In another implementation, the projector module may be implemented in terms of a short-distance projector.

In the structures shown in FIGS. 1-2, the sensor module 121 of the flexible mat structure 12 may be an infrared sensor, an infrared image capturing sensor, a pressure sensor, an ultra-sound sensor, a G-sensor, a Load Cell, a radio-frequency (RF) reader, a gyro, a gravity sensor, or combinations of at least two of the above.

Figure 3:
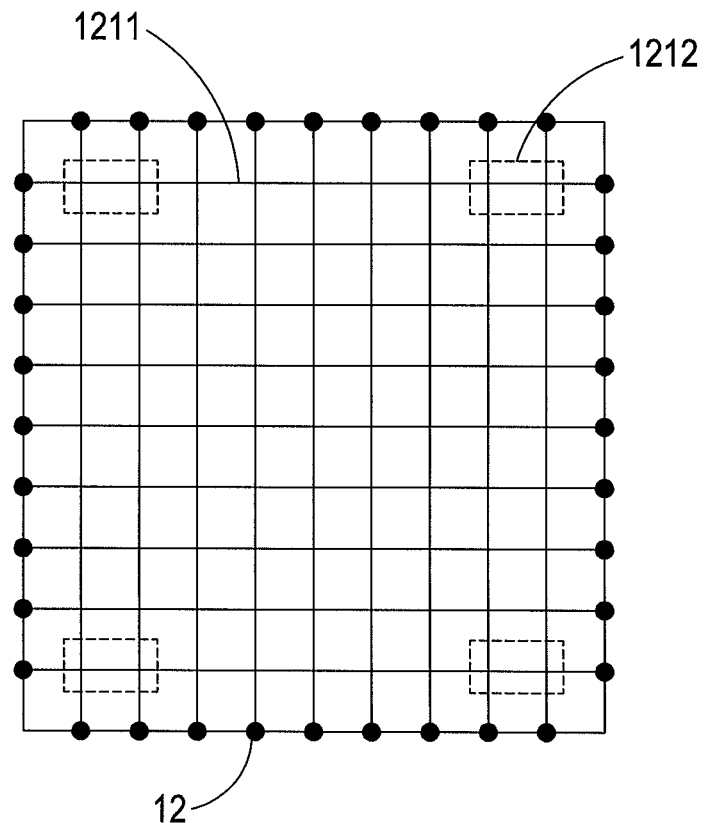
FIG. 3 shows the placement of a sensor module within a flexible mat structure of the interactive gaming apparatus according to one embodiment of the present disclosure.

As shown in FIG. 3, when the sensor module 121 is with the pressure sensor 1212 and the infrared sensor 1211 the infrared sensor 1211 and the pressure sensor 1212 may be placed within the flexible mat structure 12. Specifically, the infrared sensor 1211 may detect the position where the human operator contacts the flexible mat structure 12 by infrared interrupting. The position where the infrared interrupting occurs nay be outputted to the main body 11, allowing for the interactive gaming apparatus 1 to properly detect where the human operator and the flexible mat structure 12 contact and provide the same to the gaming software running in the computation module 111.

Figure 4A:
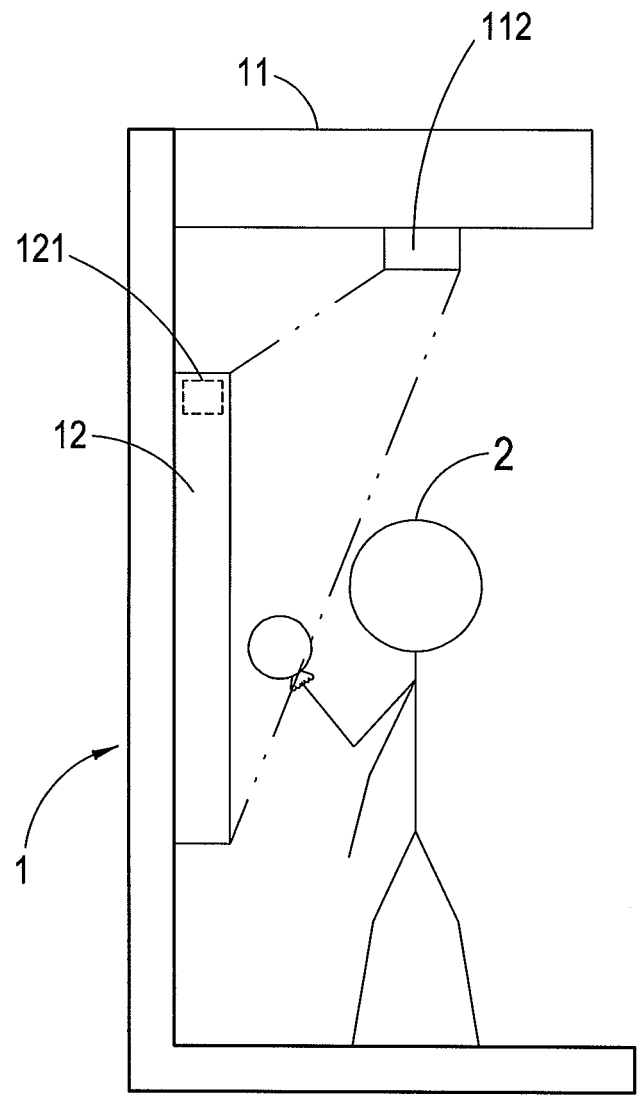
FIG. 4A shows one change resulting from and corresponding to the operation of the human operator on the flexible mat structure of the interactive gaming apparatus according to one embodiment of the present disclosure.
Figure 4B:
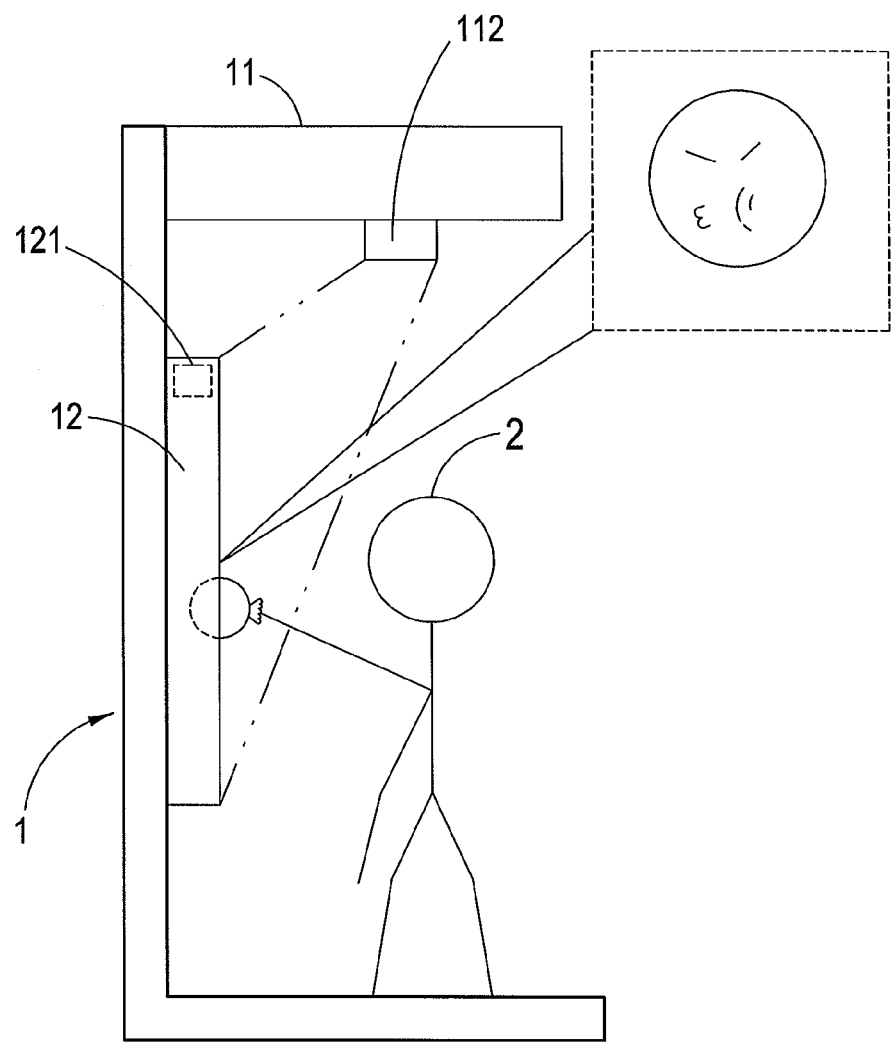
FIG. 4B shows another change resulting from and corresponding to the operation of the human operator on the flexible mat structure of the interactive gaming apparatus according to one embodiment of the present disclosure.

Additionally, when the pressure sensor 1212 is used the effect in both FIGS. 4A-4B may be achieved. Specifically, if a human face is presented on the flexible mat structure 12 and when such human face is hit the impact on the human face may be determined based on the pressure associated with the hit exerted on the pressure sensor. In other words, the impact on the human face may vary depending on the strength of the hit.

Figure 5A:
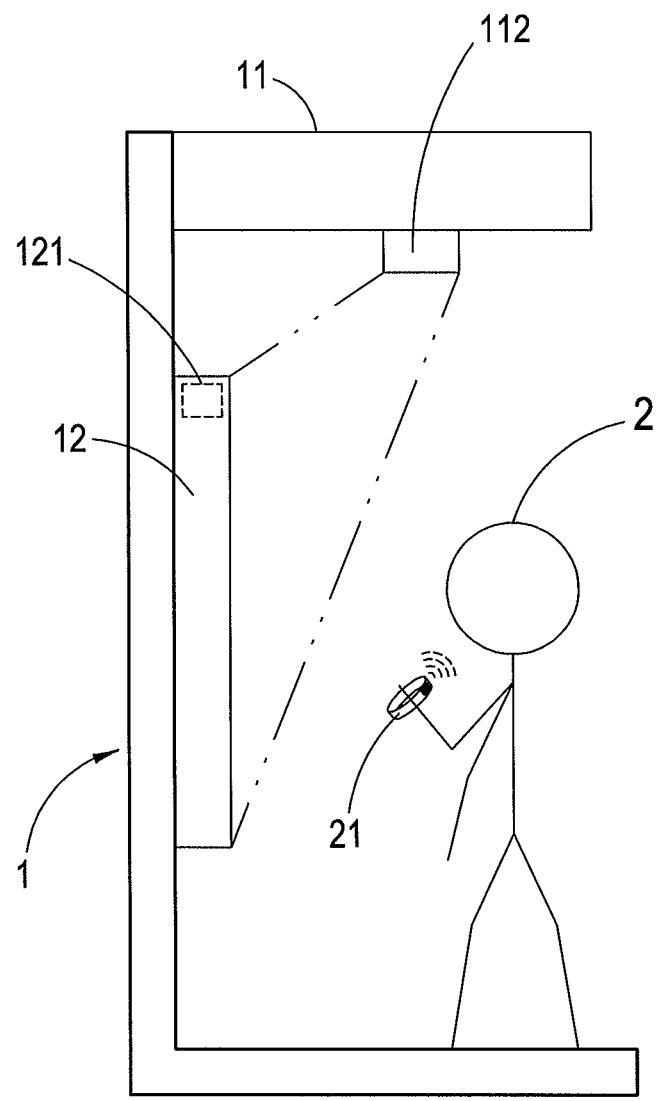
FIG. 5A shows another change resulting from and corresponding to the operation of the human operator on the flexible mat structure of the interactive gaming apparatus according to one embodiment of the present disclosure.

As shown in FIG. 5A, when the sensor module 121 is equipped with the RFID reader the RFID reader may access an RFID tag 21 of a human operator 2 standing in front of the flexible mat structure 12 (for example, the human operator wraps the RFID tag 21 around his/her arm) before delivering the corresponding information to the computation module 111. The computation module 111 may compute the relevant information and enable the projector module 112 to project an output image associated with the RFID tag 21 upon the surface of the flexible mat structure 12. The output image in one implementation may be a user interface of the gaming software.

Figure 5B:
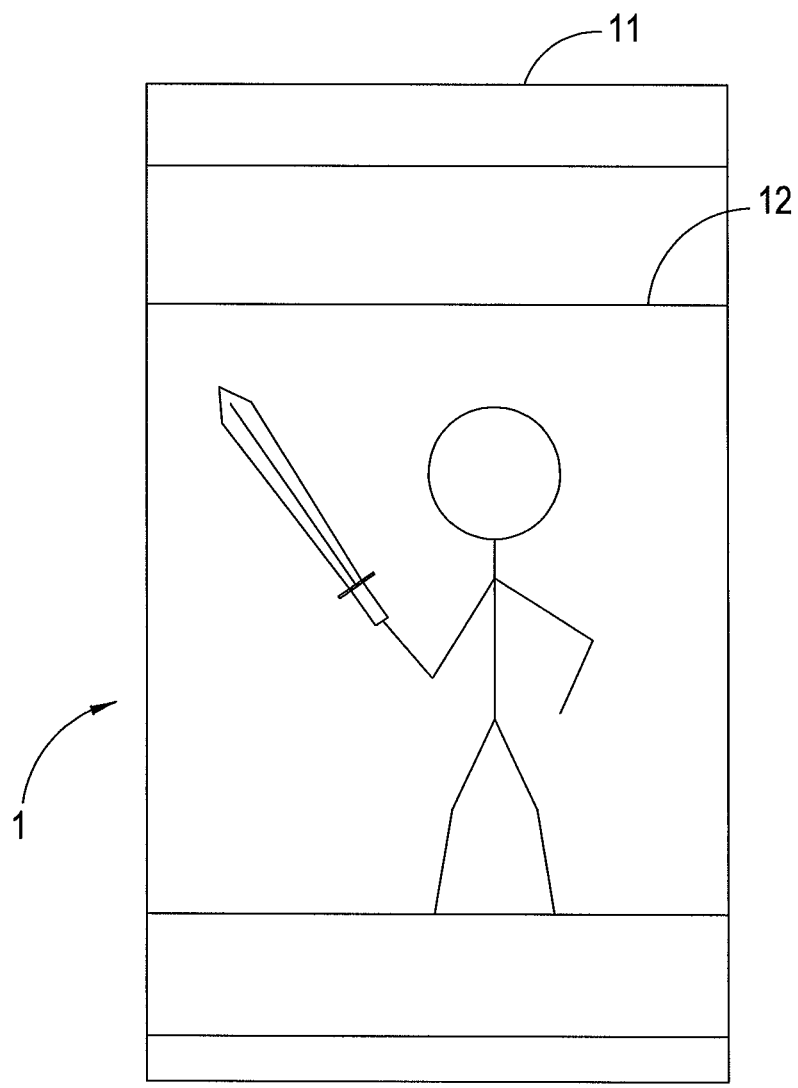
FIG. 5B shows another change resulting from and corresponding to the operation of the human operator on the flexible mat structure of the interactive gaming apparatus according to one embodiment of the present disclosure.

With the sensor module 121, when the human operator 2 operates the interactive gaming apparatus 1 the actions, motions, or moves of the human operator 2 may be reflected in the graphics of the execution of the gaming software. The RFID reader may correspond to single gaming equipment, and the use of the gaming equipment with the RFID tag 21 may be detected and projected upon the surface of the flexible mat structure 12. For example, as shown in FIG. 5B, the gaming equipment may be sword and the RFID reader when accessing the RFID tag associated with the sword may present the human operator holding the sword. In another implementation, different RFID tags may be available for different gaming equipments to enhance the versatility of the gaming experience.

Figure 6:
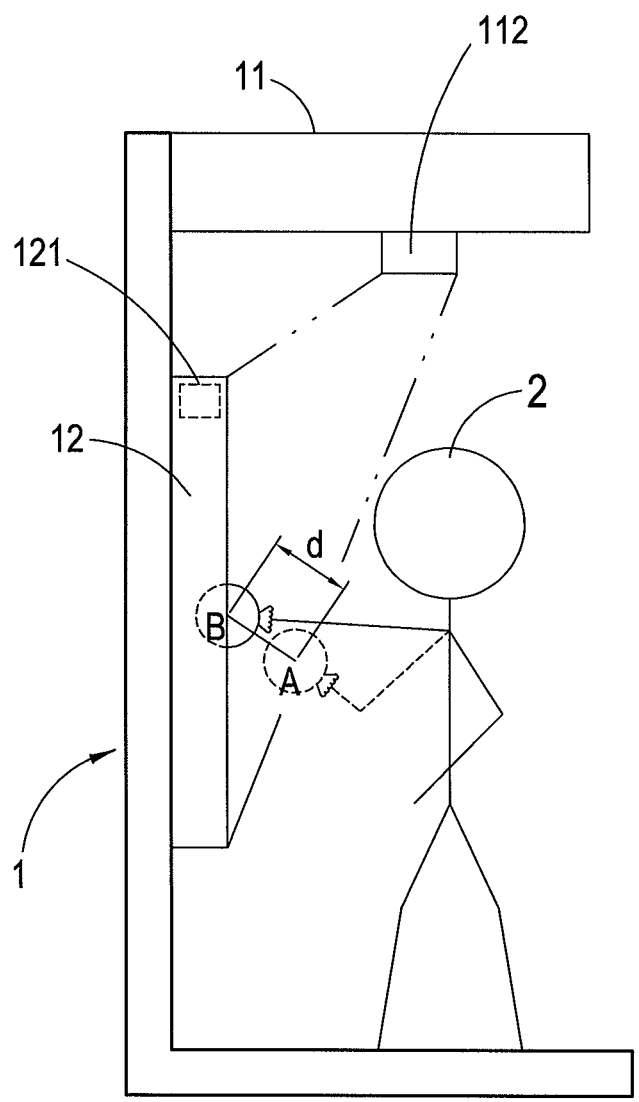
FIG. 6 is a schematic diagram showing velocity and angular motion detection by the interactive gaming apparatus according to one embodiment of the present disclosure.

As shown in FIG. 6, when the sensor module 121 includes the gyro and the gravity sensor the actions, moves, and motions of the human operator 2 may be determined.

Specifically, by the gravity sensor the sensor module 121 may detect the information of the velocity and the displacement of the human operator 2 when the human operator 2 hits the flexible mat structure 12 and deliver the same to the computation module 111. With the gyro, the angular data of the human operator 2 may be detected and delivered to the computation module 111.

Figure 7:
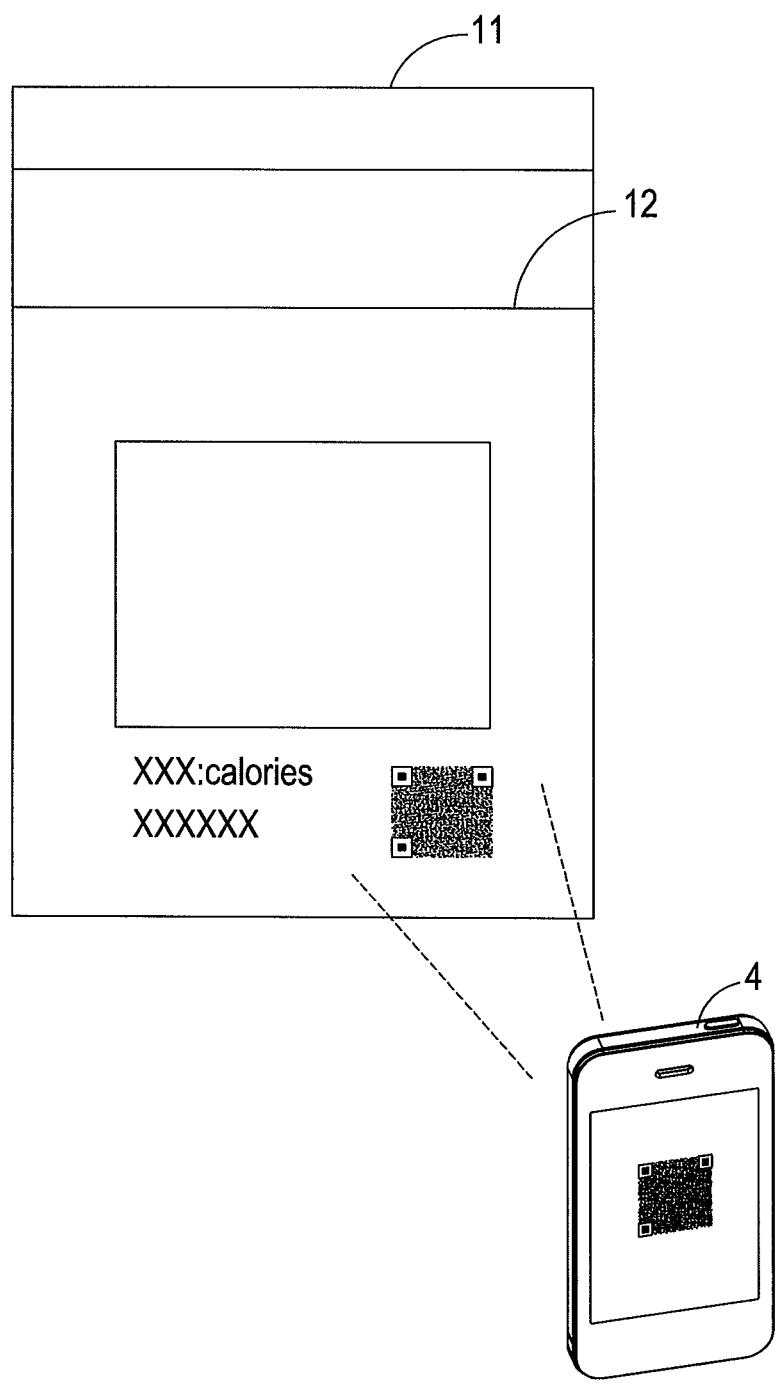
FIG. 7 shows reading QR codes by the interactive gaming apparatus according to one embodiment of the present disclosure.
Figure 8:
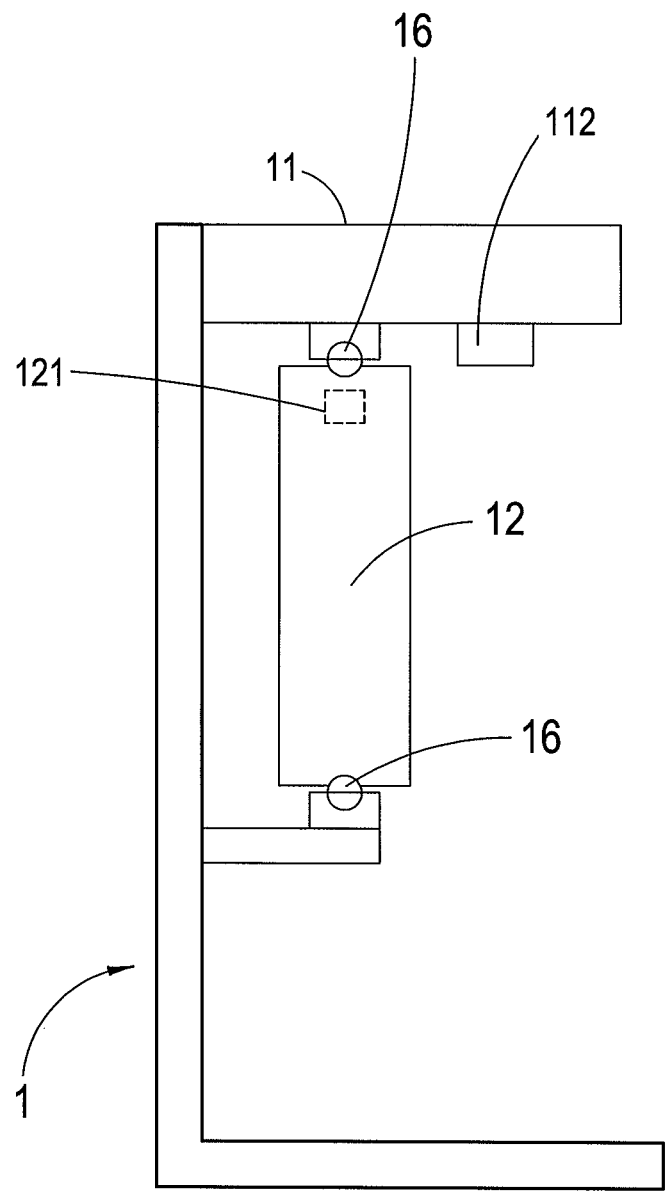
FIG. 8 shows another structural schematic diagram of the flexible mat structure according to one embodiment of the present disclosure.

With the computation of the actions/moves/motions of the human operator 2, calories consumed in the process may be derived and presented on the surface of the flexible mat structure 2. Such computational result may be outputted in a readable medium. As shown in FIG. 7, QR codes corresponding to the consumed calories may be displayed on the surface of the flexible mat structure 12 and a smart phone 4 may be employed by the human operator 2 to read the QR codes and store the same therein. Consequently, the calories burned in each round of the interactivity between the human operator and the gaming software may be properly recorded.

Plus, when the sensor module 121 includes the gravity sensor such gravity sensor may not generate reliable detection results because of the inherent gravity if the flexible mat structure 12 is adhered to the main body 11 directly. To address this, an adjoining device 16 may be used to connect the flexible mat structure 12 and the gaming apparatus 1 so as to offset the weight of the flexible mat structure (as the result of the inherent gravity) and therefore to minimize the occurrence of the inaccurate sensing.

In one implementation, the adjoining device 16 may be a bearing or a simplified engaging mechanism. The adjoining device 16 may ensure the flexible mat structure 12 may not lean against one surface. With the support of the adjoining device 16, at the time the flexible mat structure 12 is hit the flexible mat structure 12 may bounce as the result, offering the better user experience.

Figure 9:
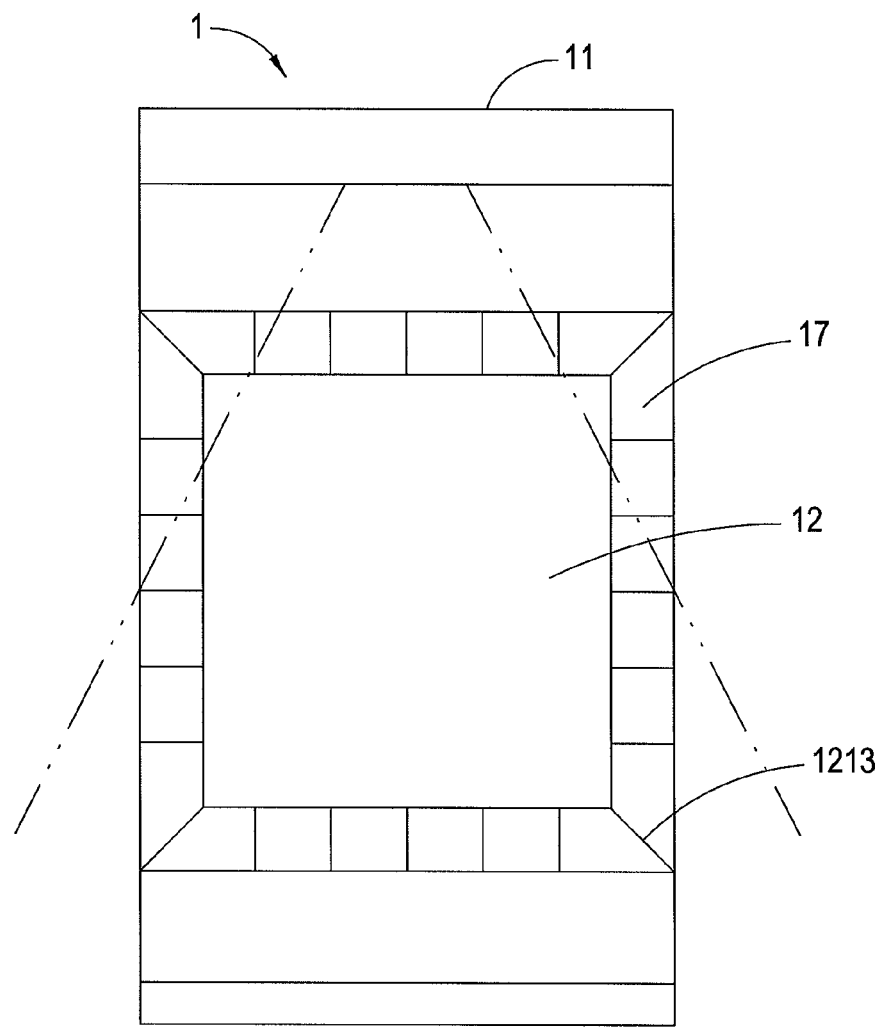
FIG. 9 shows another schematic diagram of the flexible mat structure according to one embodiment of the present disclosure.

In view of the structure in FIGS. 1 and 2, FIG. 9 shows one embodiment of the flexible mat structure 12 adjoining with the main body 11 through a spring pulling force component 17. In order to detect the contact data when the human operator contacts the flexible mat structure 12, the sensor module 121 may be with a pulling force meter 1213. The pulling force meter 1213 may extend from the flexible mat structure 12 as shown in FIG. 9.

Figure 10:
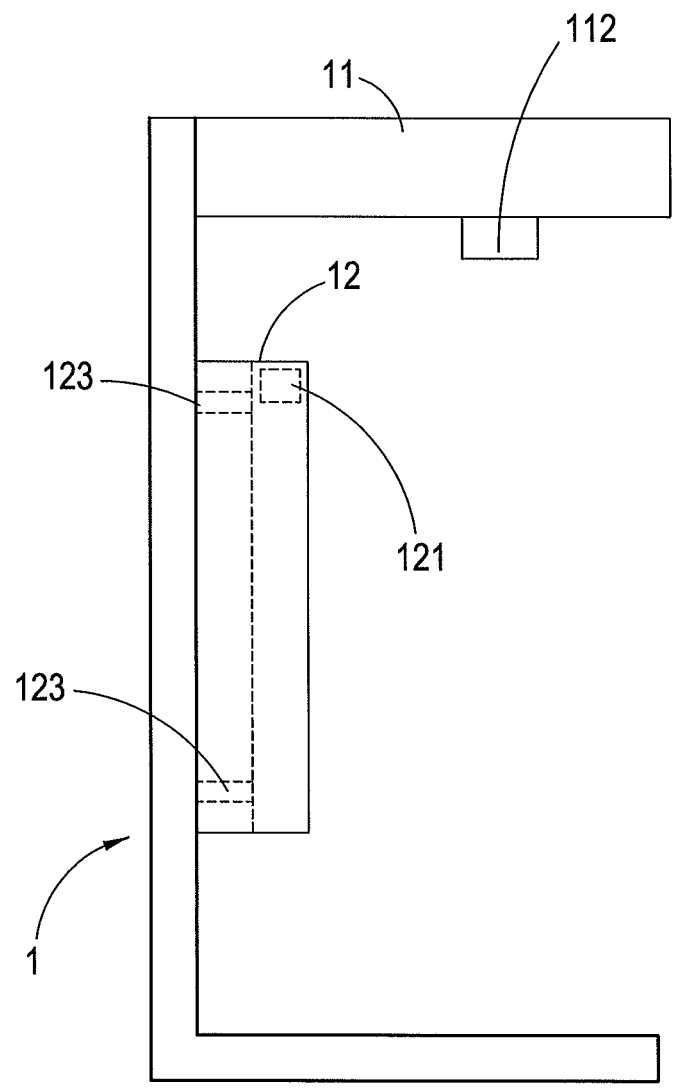
FIG. 10 shows the placement of another sensor module within the flexible mat structure of the interactive gaming apparatus according to one embodiment of the present disclosure.

Also in view of the same FIGS. 1-2, the flexible mat structure 12 may be made of flexible material allowing for the output image to be projected upon the surface thereof and having the sensor module 121 installed therein. A hydraulic pump 123 may be integrated with the flexible mat structure 12. The hydraulic pump 123 may be coupled to the flexible mat structure 12 as shown in FIG. 10. As the hydraulic pump 123 is connected to the flexible mat structure 12, when the pressure asserted by the human operator 2 to the flexible mat structure 12 the pressure sensor 1212 may detect the extent of such pressure. The hydraulic pump 123 may provide the feedback corresponding to the exerted pressure, enabling the human operator 2 to be the receiving end of the vibration from the flexible mat structure and therefore enhancing the user experience.

Figure 11A:
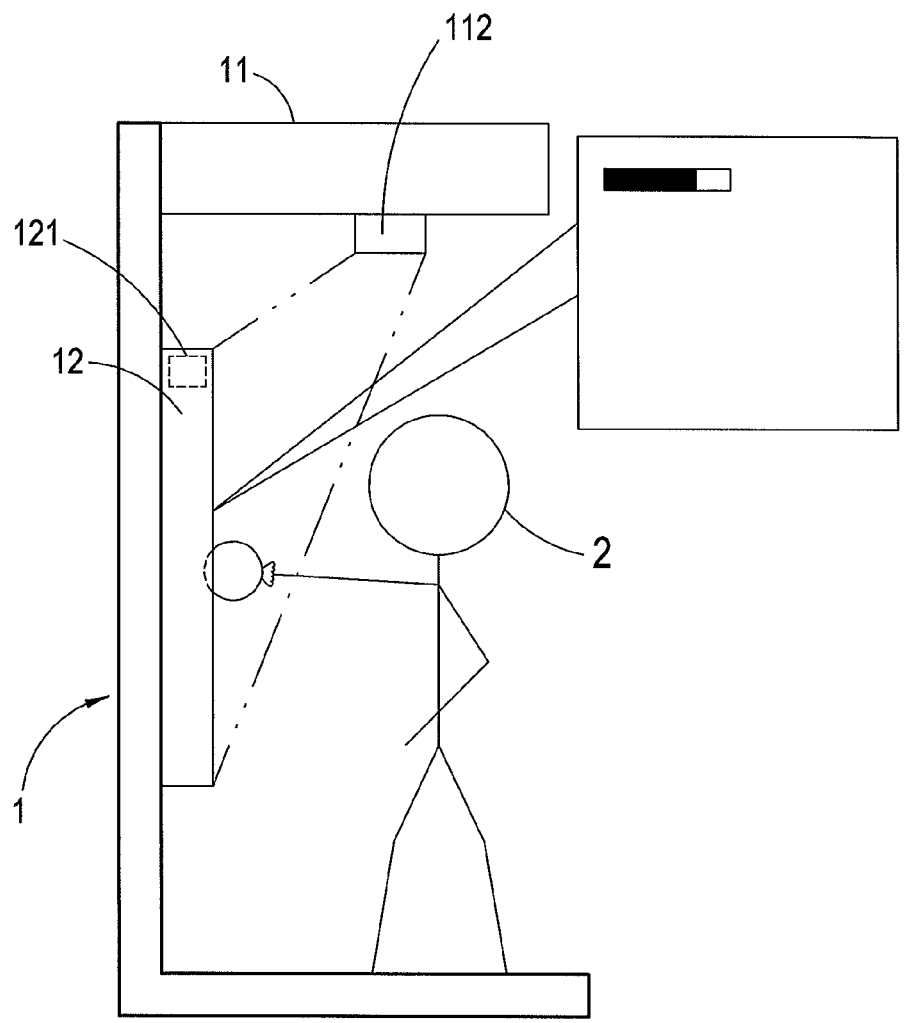
FIG. 11A shows one change resulting from and corresponding to the operation of the human operator on the flexible mat structure of the interactive gaming apparatus according to one embodiment of the present disclosure.
Figure 11B:
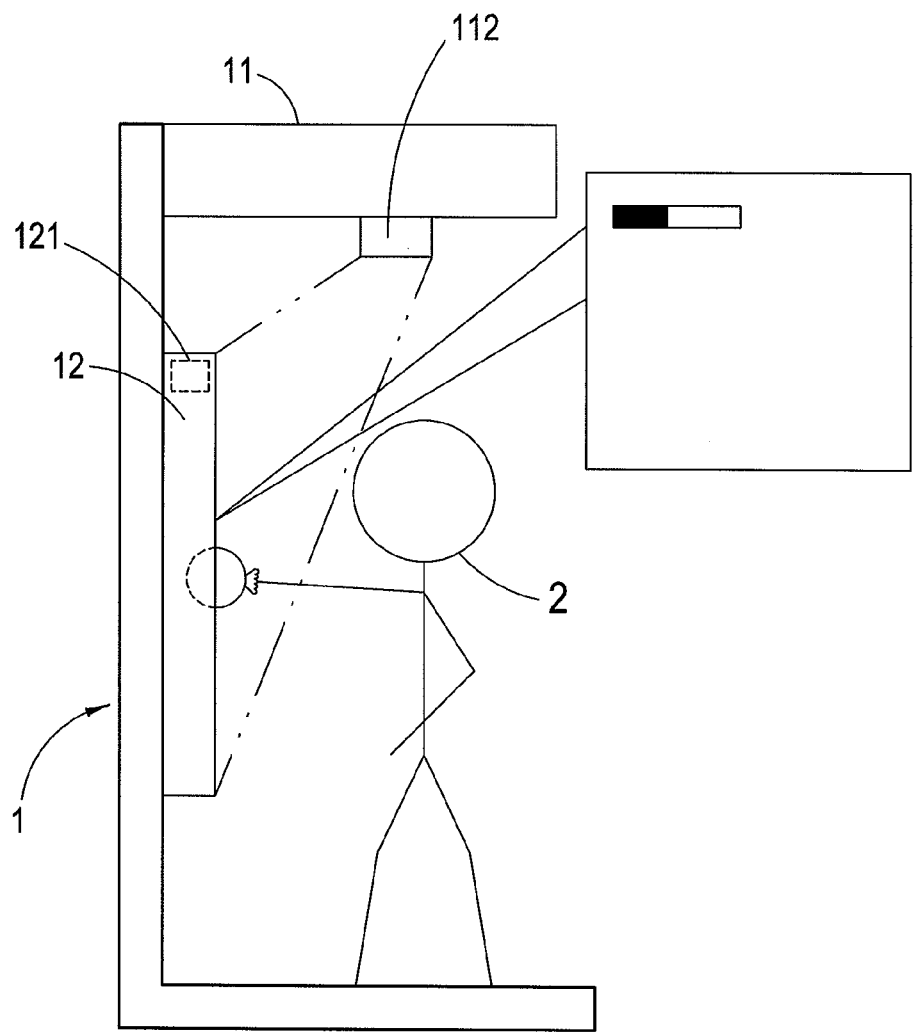
FIG. 11B shows another change resulting from and corresponding to the operation of the human operator on the flexible mat structure of the interactive gaming apparatus according to one embodiment of the present disclosure.

Plus, when the human operator 2 exerts the pressure or contacts the flexible mat structure 12 the sensor module 121 may transmit the information/data of the motions or actions to the computation module 111. When the contact upon the flexible mat structure 12 is slight, the corresponding "slight" impact data/information may be detected by the sensor module 121 and delivered to the computation module 111, which in turn convert such contact data into the impact information in the gaming software context. As shown in FIGS. 11A and 11B, when the contact is slight the damage to the game character may be less than that associated with the significant contact exerted by the human operator. The corresponding image or graphics along with the changes to the same because of the damage may thereafter be projected upon the surface of the flexible mat structure 12 by the projector module 112.

The flexible mat structure 12 may be an inflatable flexible mat structure. In such case, the sensor module 121 may detect the change to the air pressure of the inflatable flexible mat structure when the human operator contacts the flexible mat structure. The computation module 111 may cause the same to be reflected in the output image based on the change to the air pressure. The sensor module 121 detecting the air pressure change may be based on the combination of the infrared and the pressure sensing, the air pressure detecting with the inflatable flexible mat structure, an ultra-sound sensor, a G-sensor, or their combinations.

Figure 12:
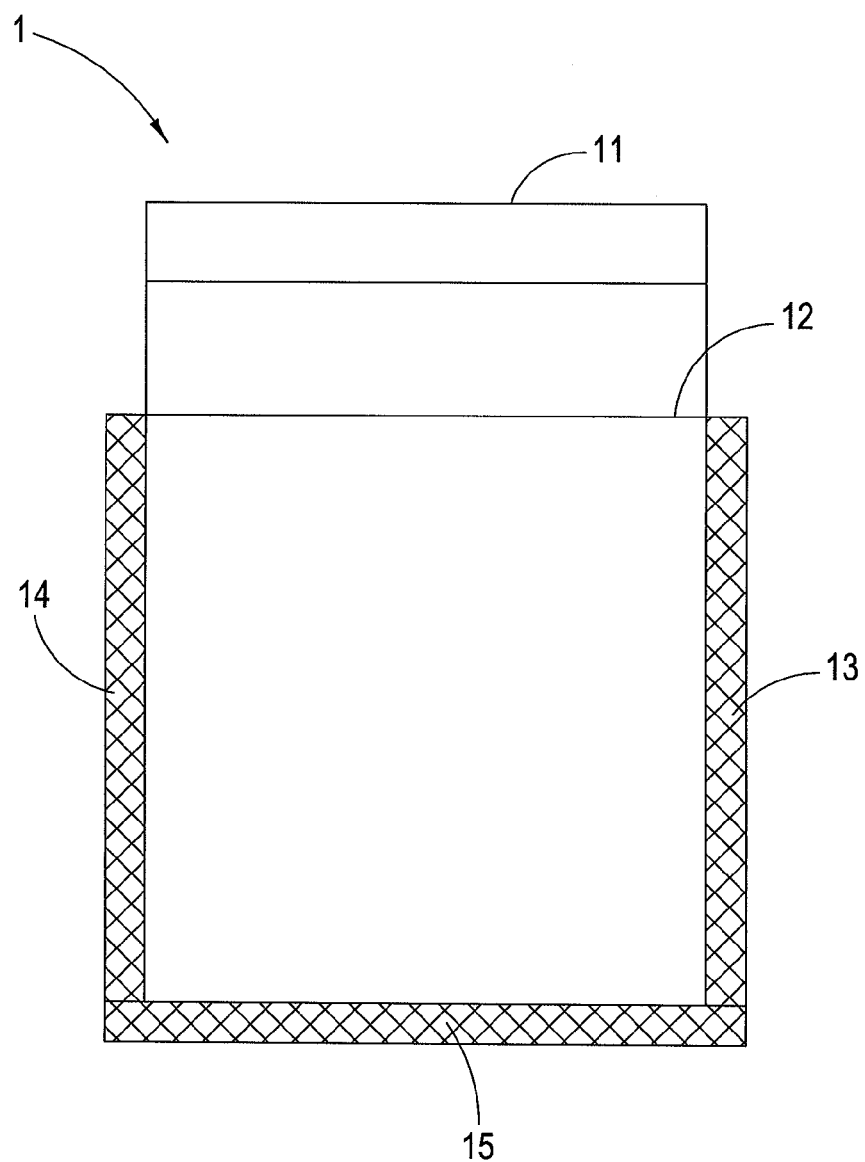
FIG. 12 is another structural schematic diagram of the interactive gaming apparatus according to one embodiment of the present disclosure.

As shown in FIG. 12, multiple peripheral flexible mats 13-15 may be disposed surrounding the flexible mat structure 12. Each of the peripheral flexible mats may be equipped with the same sensor module in the flexible mat structure. With the peripheral mats 13-15, the contacts from multiple angles/directions may be detected so that the actions/motions of the human operator may be more precisely reflected. In other words, absent the peripheral mats 13-15 the flexible mat structure 12 may only be able to detect the contact from one direction, capping the performance of the contact detection and therefore the overall motion/action detection of the human operator. With the peripheral mats 13-15, the contact data arising out of the contact taking place at the peripheral mats 13-15 may be delivered to the computation module 111.

Figure 13:
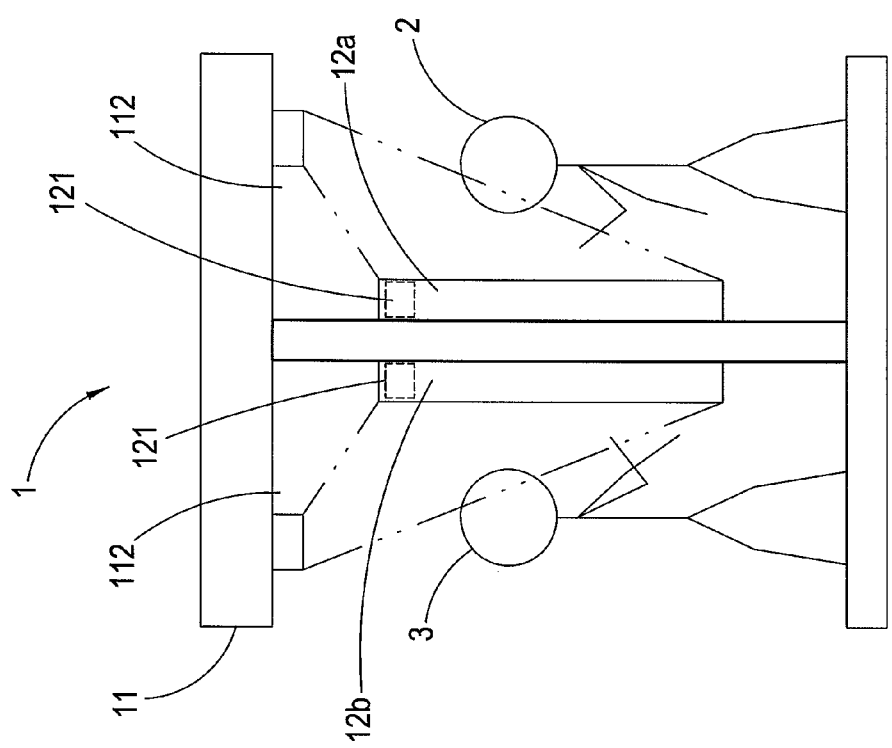
FIG. 13 is an schematic diagram of the interactive gaming apparatus for two human operators according to one embodiment of the present disclosure.

The gaming apparatus 1 may be for multiple human operators participating at the same time as shown in FIG. 13. In addition to the human operator 2, another human operator 3 may be utilizing the gaming apparatus 1 simultaneously. The flexible mat structure 12 may include a first gaming area 12a and a second gaming area 12b. Two sets of projector modules 112 may be adapted to project the output images upon the first gaming area 12a and the second gaming area 12b, respectively. As such, both human operators 2 and 3 may view the output images without obstruction. The sensor modules 121 may be used to detect the motions/actions of the human operators 2 and 3, respectively. The first gaming area 12a and the second gaming area 12b my be equipped with the sensor modules having the pressure sensors and the infrared sensors, and may properly detect the contact from both human operators 2 and 3 before delivering the contact data from the human operators 2 and 3 to the computation module 111. The computation module 111 may compute the contact data and project the corresponding output image upon the surfaces of the first gaming area 12a and the second gaming area 12b.

Figure 14A:
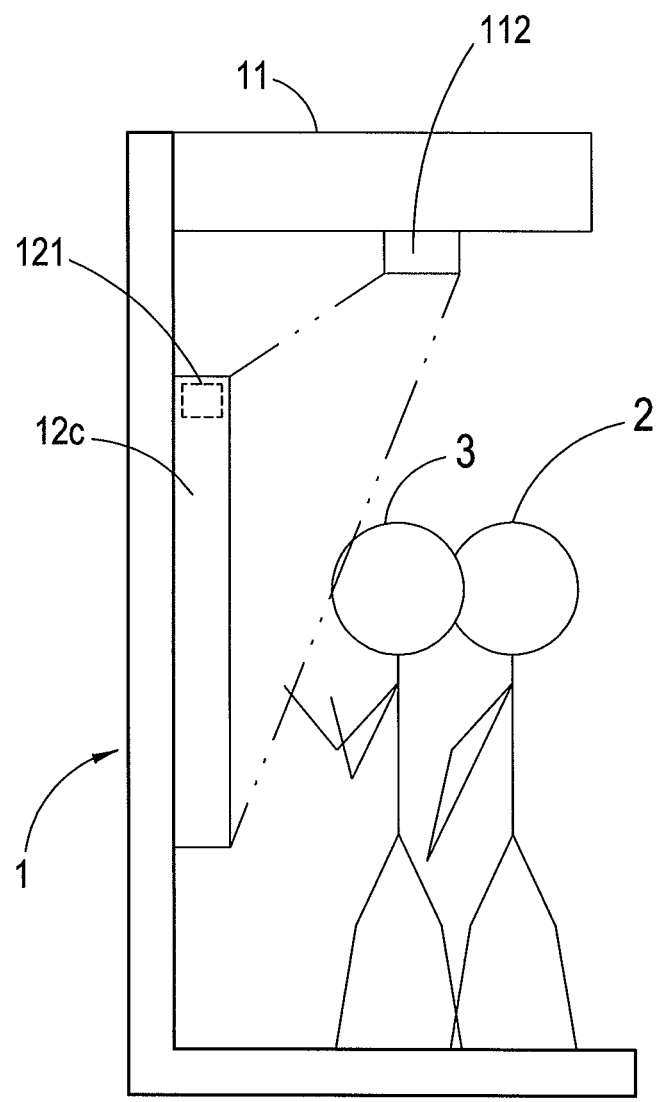
FIG. 14A is another schematic diagram of the interactive gaming apparatus for two human operators according to one embodiment of the present disclosure.
Figure 14B:
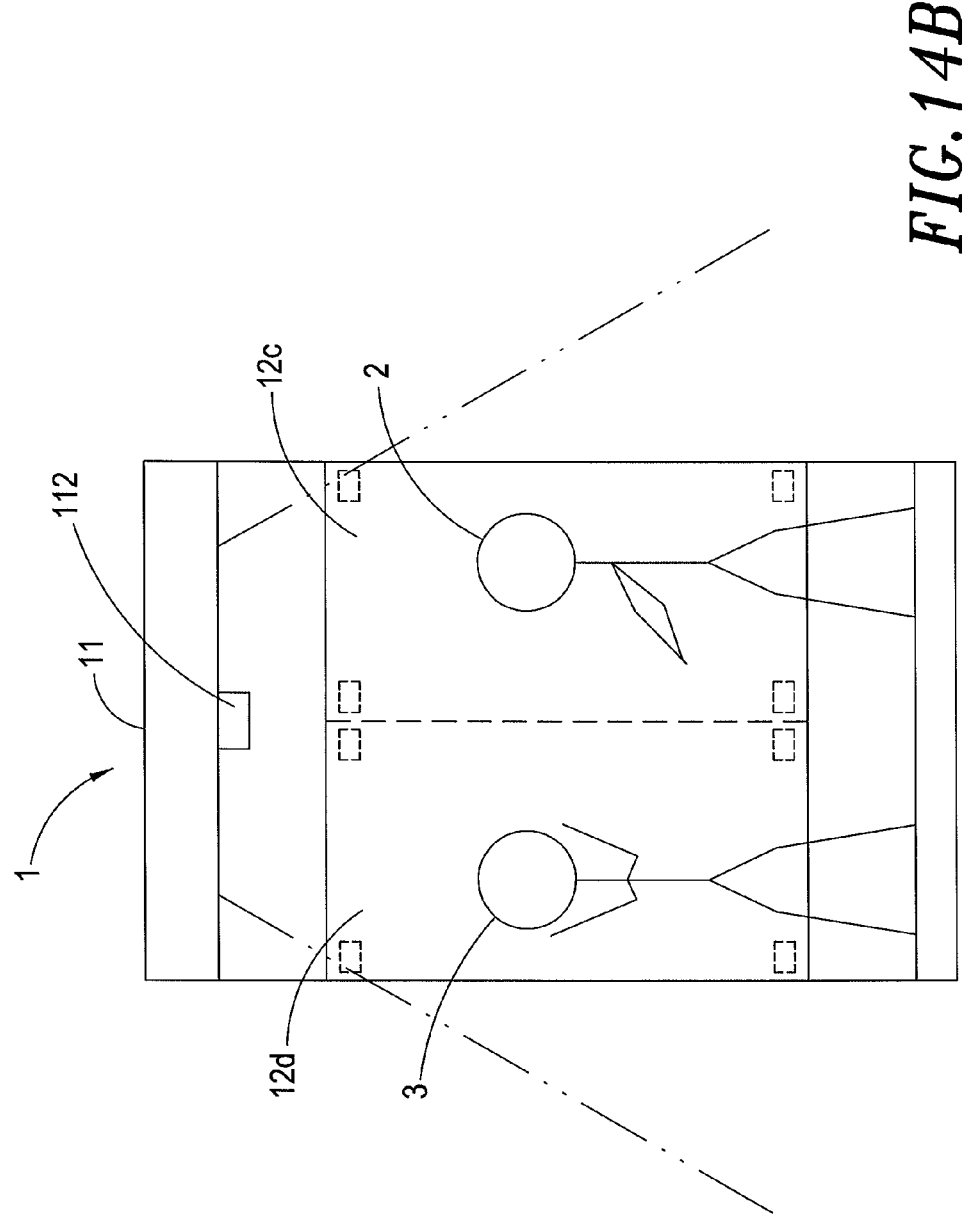
FIG. 14B is another schematic diagram of the interactive gaming apparatus for two human operators according to one embodiment of the present disclosure.

As shown in FIGS. 14A-B, the flexible mat structure 12 may include a first gaming area 12c and a second gaming area 12d allowing for the human operators 2 and 3 to operate the gaming apparatus in a side-by-side fashion. In order for the above to happen, the first gaming area 12c and the second gaming area 12d may be disposed side by side and when the projector modules 112 project the output images on the first gaming area 12c and the second gaming area 12d the human operators 2 and 3 may view them. In one implementation, both the first gaming area 12c and the second gaming area 12d may be equipped with the sensor module having the pressure sensor and the infrared sensor. Thus, the contact data of the human operators 2 and 3 may be obtained and transmitted to the computation module 111, which in turn may calculate the contact data and project the corresponding output images upon the surfaces of the first gaming area 12c and the second gaming area 12d.

It is worth noting that the gaming apparatus solely devoted to one single human operator and that for the multiple human operators may have the same main body 11 and flexible mat structure 12.

Figure 15:
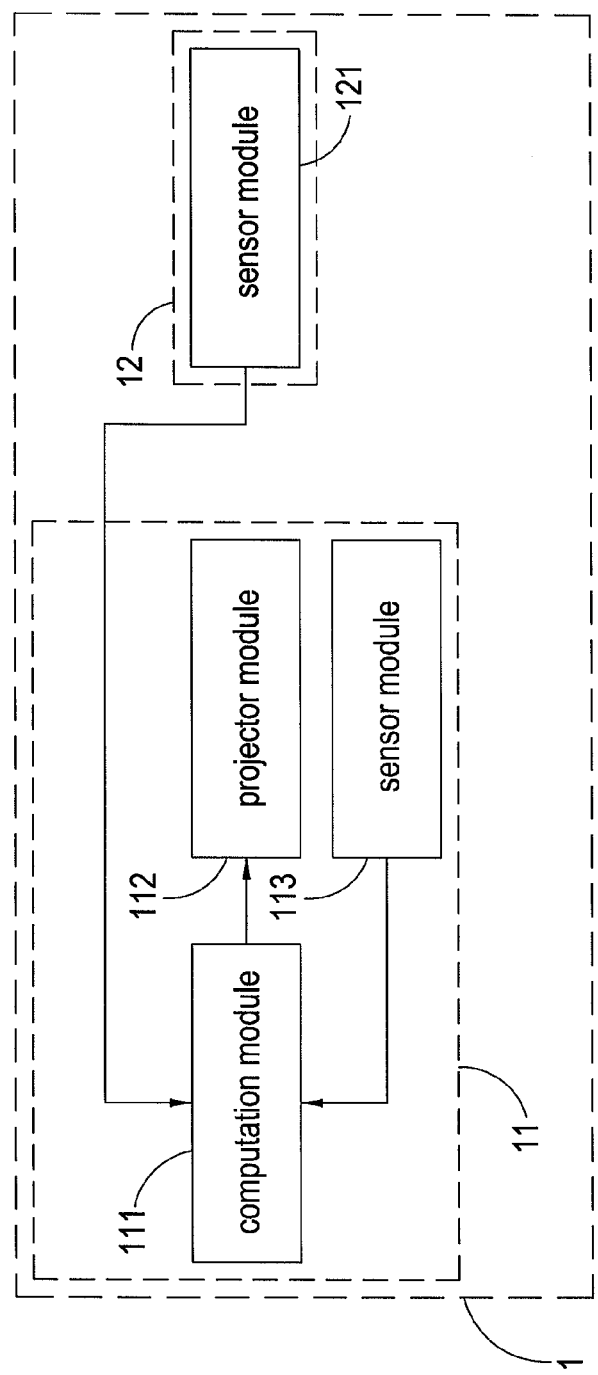
FIG. 15 is another structural schematic diagram of the interactive gaming apparatus according to one embodiment of the present disclosure.

As shown in FIG. 15, the main body 11 of the gaming apparatus 1 may be with another sensor module 113. The sensor module 113 may be the RFID reader, the gyro, the gravity sensor, or the combinations of at least two of above. With the sensor module 113, in conjunction with the sensor module 112 of the flexible mat structure 12 (which may be implemented in terms of the infrared sensor, the pressure sensor, the ultra-sound sensor, the pressure sensor, the G-sensor, or their combinations), the actions/motions of the human operators 2 and 3 may be properly and precisely detected and delivered to the computation module 111. The computation module 111, as previously mentioned, may compute the contact data into the corresponding changes utilized by the gaming software running at the gaming apparatus, before projecting the output images on the surface of the flexible mat structure 12 by the projector module 112.

Compared with the traditional arts, the present disclosure may be with the following advantages: (1) the gaming apparatus in the present disclosure may incorporate a variety of sensor modules and at least one flexible mat structure as the display device, enabling the motions/actions of the human operator to be more precisely presented on the display device, offering the enhanced user experience when the human operator is in contact with the flexible mat structure, and improving the overall interactivity; and (2) the present disclosure therefore is applicable in AVG, STG, GSTG, ACT, FTG, FPS, SPG, or RAG.

Some modifications of these examples, as well as other possibilities will, on reading or having read this description, or having comprehended these examples, will occur to those skilled in the art. Such modifications and variations are comprehended within this disclosure as described here and claimed below. The description above illustrates only a relative few specific embodiments and examples of the present disclosure. The present disclosure, indeed, does include various modifications and variations made to the structures and operations described herein, which still fall within the scope of the present disclosure as defined in the following claims.

What is claimed is:

1. An interactive gaming apparatus, comprising:
   a flexible mat structure disposed at a predetermined position ahead of a human operator, the flexible mat structure having at least one sensor module placed therein, and the sensor module detecting contact data when the human operator contacts the flexible mat structure;
   a main body having a computation module with gaming software installed therein, the computation module executing the gaming software, and the sensor module delivering the contact data to the computation module; and
   a projector module for projecting an output image upon a surface of the flexible mat structure when the computation module executes the gaming software,
   wherein the flexible mat structure is made of flexible material, and
   wherein the flexible material is silica gel.

2. The gaming apparatus according to claim 1, wherein the flexible mat structure is an inflatable flexible mat.

3. The gaming apparatus according to claim 2, wherein the sensor module is an air pressure detector.

4. The gaming apparatus according to claim 1, wherein the flexible mat structure engages with the main body through a spring pulling force component.

5. An interactive gaming apparatus, comprising:
   a flexible mat structure disposed at a predetermined position ahead of a human operator, the flexible mat structure having at least one sensor module s laced therein, and the sensor module detecting contact data when the human operator contacts the flexible mat structure;
   a main body having a computation module with gaming software installed therein, the computation module executing the gaming software, and the sensor module delivering the contact data to the computation module; and
   a projector module for projecting an output image upon a surface of the flexible mat structure when the computation module executes the gaming software,
   wherein the flexible mat structure engages with the main body through a spring pulling force component, and
   wherein the sensor module of the flexible mat structure is a pulling force meter.

6. The gaming apparatus according to claim 1, wherein the sensor module is an infrared sensor, an infrared image capturing sensor, a pressure sensor, an ultra-sound sensor, a G-sensor, a Load Cell, a radio-frequency (RF) reader, a gyro, a gravity sensor, or combinations of at least two of the above.

7. The gaming apparatus according to claim 6, wherein the infrared sensor detects the position where the human operator contacts the flexible mat structure by infrared interrupting, before transmitting the corresponding contact data to the gaming software executed by the computation module.

8. The gaming apparatus according to claim 6, wherein the pressure sensor detects pressure exerted by the human operator to the flexible mat structure before transmitting the corresponding contact data to the computation module.

9. An interactive gaming apparatus, comprising:
   a flexible mat structure disposed at a predetermined position ahead of a human operator, the flexible mat structure having at least one sensor module placed therein, and the sensor module detecting contact data when the human operator contacts the flexible mat structure;
   a main body having a computation module with gaming software installed therein, the computation module executing the gaming software, and the sensor module delivering the contact data to the computation module; and
   a projector module for projecting an output image upon a surface of the flexible mat structure when the computation module executes the gaming software,
   wherein the sensor module is an infrared sensor, an infrared image capturing sensor, a pressure sensor, an ultra-sound sensor, a G-sensor, a Load Cell, a radio-frequency (RF) reader, a gyro, a gravity sensor, or combinations of at least two of the above,
   wherein the pressure sensor detects pressure exerted by the human operator to the flexible mat structure before transmitting the corresponding contact data to the computation module, and
   wherein the flexible mat structure further comprises a hydraulic pump connected to the sensor module for feeding back the human operator based on the pressure exerted by the human operator to the flexible mat structure at the time the human operator contacts the flexible mat structure.

10. The gaming apparatus according to claim 1, further comprising at least one peripheral flexible mat surrounding the flexible mat structure, wherein the peripheral flexible mat is equipped with a peripheral sensor module for detecting the contact data from multiple angles before delivering the contact data to the computation module.

11. The gaming apparatus according to claim 1, further comprising an adjoining device through which the flexible mat structure engages the main body.

12. An interactive gaming apparatus, comprising:
a flexible mat structure disposed at a predetermined position ahead of a human operator, the flexible mat structure having at least one sensor module placed therein, and the sensor module detecting contact data when the human operator contacts the flexible mat structure;
a main body having a computation module with gaming software installed therein, the computation module executing the gaming software, and the sensor module delivering the contact data to the computation module;
a projector module for projecting an output image upon a surface of the flexible mat structure when the computation module executes the gaming software; and
an adjoining device through which the flexible mat structure engages the main body,
wherein the adjoining device is a bearing.

13. The gaming apparatus according to claim 1, wherein the computation module outputs the contact data in form of a media readable format and presents the contact data on the surface of the flexible mat structure.

14. The gaming apparatus according to claim 13, wherein the contact data in the media readable format is accessed by a portable device capable of accessing the contact data.

15. The gaming apparatus according to claim 1, wherein the flexible mat structure further comprises a first gaming area and a second gaming area, each of the first gaming area and the second gaming area corresponds to one sensor module, and the contact data from both the first gaming area and the second gaming area is inputted into the computation module.

16. An interactive gaming apparatus, comprising:
a flexible mat structure disposed at a predetermined position ahead of a human operator, the flexible mat structure having at least one sensor module placed therein, and the sensor module detecting contact data when the human operator contacts the flexible mat structure;
a main body having a computation module with gaming software installed therein, the computation module executing the gaming software, and the sensor module delivering the contact data to the computation module; and
a projector module for projecting an output image upon a surface of the flexible mat structure when the computation module executes the gaming software,
wherein the flexible mat structure further comprises a first gaming area and a second gaming area, each of the first gaming area and the second gaming area corresponds to one sensor module, and the contact data from both the first gaming area and the second gaming area is inputted into the computation module, and
wherein the first gaming area and the second gaming area are located at two of the opposite surfaces of the flexible mat structure allowing for two human operators to utilize the gaming apparatus in a face-to-face fashion.

17. The gaming apparatus according to claim 15, wherein the first gaming area and the second gaming area are located at the same surface of the flexible mat structure allowing for two human operators to utilize the gaming apparatus in a side-by-side fashion.

18. An interactive gaming apparatus, comprising:
a flexible mat structure disposed at a predetermined position ahead of a human operator, the flexible mat structure having at least one first sensor module placed therein, and the first sensor module detecting contact data when the human operator contacts the flexible mat structure;
a main body having a computation module with gaming software installed therein, the computation module executing the gaming software, and the first sensor module delivering the contact data to the computation module;
a projector module for projecting an output image upon a surface of the flexible mat structure when the computation module executes the gaming software; and
a second sensor module connected to the computation module for detecting an operating status associated with the human operator and transmitting operating status data to the computation module, which in turn computes the operating status data to derive the corresponding output image,
wherein the projector module projects the output image upon the surface of the flexible mat structure,
wherein the flexible mat structure is made of flexible material, and
wherein the flexible material is silica gel.

19. The gaming apparatus according to claim 18, wherein the flexible mat structure is an inflatable flexible mat.

20. The gaming apparatus according to claim 19, wherein the first sensor module is an air pressure detector.

21. The gaming apparatus according to claim 18, wherein the flexible mat structure engages with the main body through a spring pulling force component.

22. An interactive gaming apparatus, comprising:
a flexible mat structure disposed at a predetermined position ahead of a human operator, the flexible mat structure having at least one first sensor module placed therein, and the first sensor module detecting contact data when the human operator contacts the flexible mat structure;
a main body having a computation module with gaming software installed therein, the computation module executing the gaming software, and the first sensor module delivering the contact data to the computation module;
a projector module for projecting an output image upon a surface of the flexible mat structure when the computation module executes the gaming software; and
a second sensor module connected to the computation module for detecting an operating status associated with the human operator and transmitting operating status data to the computation module, which in turn computes the operating status data to derive the corresponding output image,
wherein the projector module projects the output image upon the surface of the flexible mat structure,
wherein the flexible mat structure engages with the main body through a spring pulling force component, and wherein the first sensor module of the flexible mat structure is a pulling force meter.

23. The gaming apparatus according to claim 18, wherein the first sensor module is an infrared sensor, an infrared image capturing sensor, a pressure sensor, an ultra-sound sensor, a G-sensor, a Load Cell, a radio-frequency (RF) reader, a gyro, a gravity sensor, or combinations of at least two of the above.

24. The gaming apparatus according to claim 23, wherein the infrared sensor detects the position where the human operator contacts the flexible mat structure by infrared interrupting, before transmitting the corresponding contact data to the gaming software executed by the computation module.

25. The gaming apparatus according to claim 23, wherein the pressure sensor detects pressure exerted by the human operator to the flexible mat structure before transmitting the corresponding contact data to the computation module.

26. An interactive gaming apparatus, comprising:
   a flexible mat structure disposed at a predetermined position ahead of a human operator, the flexible mat structure having at least one first sensor module placed therein, and the first sensor module detecting contact data when the human operator contacts the flexible mat structure;
   a main body having a computation module with gaming software installed therein, the computation module executing the gaming software, and the first sensor module delivering the contact data to the computation module;
   a projector module for projecting an output image upon a surface of the flexible mat structure when the computation module executes the gaming software; and
   a second sensor module connected to the computation module for detecting an operating status associated with the human operator and transmitting operating status data to the computation module, which in turn computes the operating status data to derive the corresponding output image,
   wherein the projector module projects the output image upon the surface of the flexible mat structure,
   wherein the first sensor module is an infrared sensor, an infrared image capturing sensor, a pressure sensor, an ultra-sound sensor, a G-sensor, a Load Cell, a radio-frequency (RF) reader, a gyro, a gravity sensor, or combinations of at least two of the above,
   wherein the pressure sensor detects pressure exerted by the human operator to the flexible mat structure before transmitting the corresponding contact data to the computation module, and
   wherein the flexible mat structure further comprises a hydraulic pump connected to the first sensor module for feeding back the human operator based on the pressure exerted by the human operator to the flexible mat structure at the time the human operator contacts the flexible mat structure.

27. The gaming apparatus according to claim 18, further comprising at least one peripheral flexible mat surrounding the flexible mat structure, wherein the peripheral flexible mat is equipped with a peripheral sensor module for detecting the contact data from multiple angles before delivering the contact data to the computation module.

28. The gaming apparatus according to claim 18, further comprising an adjoining device through which the flexible mat structure engages the main body.

29. An interactive gaming apparatus, comprising:
   a flexible mat structure disposed at a predetermined position ahead of a human operator, the flexible mat structure having at least one first sensor module placed therein, and the first sensor module detecting contact data when the human operator contacts the flexible mat structure;
   a main body having a computation module with gaming software installed therein, the computation module executing the gaming software, and the first sensor module delivering the contact data to the computation module;
   a projector module for projecting an output image upon a surface of the flexible mat structure when the computation module executes the gaming software;
   a second sensor module connected to the computation module for detecting an operating status associated with the human operator and transmitting operating status data to the computation module, which in turn computes the operating status data to derive the corresponding output image; and
   an adjoining device through which the flexible mat structure engages the main body,
   wherein the projector module projects the output image upon the surface of the flexible mat structure, and
   wherein the adjoining device is a bearing.

30. The gaming apparatus according to claim 18, wherein the computation module outputs the contact data in form of a media readable format and presents the contact data on the surface of the flexible mat structure.

31. The gaming apparatus according to claim 30, wherein the contact data in the media readable format is accessed by a portable device capable of accessing the contact data.

32. The gaming apparatus according to claim 18, wherein the flexible mat structure further comprises a first gaming area and a second gaming area, each of the first gaming area and the second gaming area corresponds to the first sensor module, and the contact data from both the first gaming area and the second gaming area is inputted into the computation module.

33. An interactive gaming apparatus, comprising:
   a flexible mat structure disposed at a predetermined position ahead of a human operator, the flexible mat structure having at least one first sensor module placed therein, and the first sensor module detecting contact data when the human operator contacts the flexible mat structure;
   a main body having a computation module with gaming software installed therein, the computation module executing the gaming software, and the first sensor module delivering the contact data to the computation module;
   a projector module for projecting an output image upon a surface of the flexible mat structure when the computation module executes the gaming software; and
   a second sensor module connected to the computation module for detecting an operating status associated with the human operator and transmitting operating status data to the computation module, which in turn computes the operating status data to derive the corresponding output image,
   wherein the projector module projects the output image upon the surface of the flexible mat structure,
   wherein the flexible mat structure further comprises a first gaming area and a second gaming area, each of the first gaming area and the second gaming area corresponds to the first sensor module, and the contact data from both the first gaming area and the second gaming area is inputted into the computation module, and wherein the first gaming area and the second gaming area are located at two of the opposite surfaces of the flexible mat structure allowing for two human operators to utilize the gaming apparatus in a face-to-face fashion.

34. The gaming apparatus according to claim 32, wherein the first gaming area and the second gaming area are located at the same surface of the flexible mat structure allowing for two human operators to utilize the gaming apparatus in a side-by-side fashion.

35. The gaming apparatus according to claim 32, wherein the first gaming area corresponds to the first sensor module, the second gaming area corresponds to the second sensor module, and the contact data from the first gaming area and the second gaming area is delivered into the computation module.

36. The gaming apparatus according to claim 18, wherein the second sensor module is a RF reader, a gyro, a gravity sensor, or combinations of two of above.

37. An interactive gaming apparatus, comprising:
a flexible mat structure disposed at a predetermined position ahead of a human operator, the flexible mat structure having at least one first sensor module placed therein, and the first sensor module detecting contact data when the human operator contacts the flexible mat structure;
a main body having a computation module with gaming software installed therein, the computation module executing the gaming software, and the first sensor module delivering the contact data to the computation module;
a projector module for projecting an output image upon a surface of the flexible mat structure when the computation module executes the gaming software; and
a second sensor module connected to the computation module for detecting an operating status associated with the human operator and transmitting operating status data to the computation module, which in turn computes the operating status data to derive the corresponding output image, wherein the projector module projects the output image upon the surface of the flexible mat structure, wherein the second sensor module is a RF reader, a gyro, a gravity sensor, or combinations of two of above, and wherein the human operator is equipped with a RFID tag that is accessible by the RF reader, which detects the operating status data of the human operator and delivers the operating status data to the computation module, and the computation module computes the operating status data and enables the projector module to project the corresponding output image upon the surface of the flexible mat structure.

38. The gaming apparatus according to claim 36, wherein the gyro detects angular information of the human operator and delivers the angular information to the computation module.

39. The gaming apparatus according to claim 36, wherein the gravity sensor detects displacement and velocity information of the human operator and delivers the displacement and velocity information to the computation module.

* * * * *